(12) United States Patent
Usami

(10) Patent No.: US 10,013,418 B2
(45) Date of Patent: Jul. 3, 2018

(54) TRANSLATION DEVICE AND TRANSLATION SYSTEM

(71) Applicant: Panasonic Intellectual Property Management Co., Ltd., Osaka (JP)

(72) Inventor: Hikaru Usami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/298,659

(22) Filed: Oct. 20, 2016

(65) Prior Publication Data

US 2017/0116186 A1    Apr. 27, 2017

(30) Foreign Application Priority Data

Oct. 23, 2015  (JP) ................................. 2015-208531
Oct. 13, 2016  (JP) ................................. 2016-201712

(51) Int. Cl.
*G06F 17/28* (2006.01)
*G10L 13/02* (2013.01)

(52) U.S. Cl.
CPC ............ *G06F 17/289* (2013.01); *G10L 13/02* (2013.01)

(58) Field of Classification Search
CPC ....................................................... G06F 17/28
USPC ..................... 704/9, 3, 4, 235, 225; 707/269
See application file for complete search history.

(56) References Cited

U.S. PATENT DOCUMENTS

| 9,683,862 | B2* | 6/2017 | Nishikawa ......... G01C 21/3626 |
| 2004/0267527 | A1* | 12/2004 | Creamer ............. G10L 19/0018 704/235 |
| 2006/0095249 | A1 | 5/2006 | Kong et al. |
| 2007/0255552 | A1* | 11/2007 | Thiesson ........... G06F 17/30867 704/8 |
| 2010/0030549 | A1* | 2/2010 | Lee ........................ G06F 1/1626 704/4 |
| 2010/0075281 | A1* | 3/2010 | Manuel-Devadoss . G09B 19/06 434/157 |
| 2010/0306249 | A1* | 12/2010 | Hill ................... G06F 17/30867 707/769 |
| 2011/0134910 | A1* | 6/2011 | Chao-Suren .......... G06F 17/289 370/352 |
| 2012/0010816 | A1 | 1/2012 | Uyama et al. |

(Continued)

FOREIGN PATENT DOCUMENTS

| JP | 2003-22267 | 1/2003 |
| JP | 2006-246297 | 9/2006 |

(Continued)

*Primary Examiner* — Michael Colucci
(74) *Attorney, Agent, or Firm* — Wenderoth, Lind & Ponack, L.L.P.

(57) ABSTRACT

There are included an input unit for inputting an input sentence, and an output unit for outputting an output sentence obtained by translating the input sentence into a translation language. The translation language is set based on located language information and position information of a translation device. The located language information includes a predetermined location of each of a plurality of speakers and a used language of each of the plurality of speakers. Accordingly, the translation language, which is a translation target, may be set from a plurality of languages while reducing the operation burden on a user.

17 Claims, 12 Drawing Sheets

(56) References Cited

U.S. PATENT DOCUMENTS

| | | | | |
|---|---|---|---|---|
| 2012/0215850 A1* | 8/2012 | Kiesel | ............... | H04L 67/104 709/204 |
| 2012/0310622 A1* | 12/2012 | Zivkovic | ............... | G06F 17/289 704/3 |
| 2013/0238372 A1* | 9/2013 | Jordan | ............... | G06Q 10/02 705/5 |
| 2014/0162598 A1* | 6/2014 | Villa-Real | ............... | H04M 1/66 455/411 |
| 2014/0351268 A1* | 11/2014 | Weskamp | ............... | G06F 17/217 707/748 |
| 2015/0346722 A1* | 12/2015 | Herz | ............... | G05D 1/0038 701/2 |
| 2016/0188576 A1* | 6/2016 | Huang | ............... | G06F 17/2854 704/2 |

FOREIGN PATENT DOCUMENTS

| | | |
|---|---|---|
| JP | 4437168 | 3/2010 |
| JP | 2012-84939 | 4/2012 |
| JP | 5185494 | 4/2013 |
| JP | 2013-239875 | 11/2013 |
| WO | 2010/116483 | 10/2010 |

* cited by examiner

TRANSLATION DEVICE AND TRANSLATION SYSTEM

BACKGROUND

1. Technical Field

The present disclosure relates to a translation device supporting multiple languages to perform translation among a plurality of different languages, and a translation system.

2. Description of the Related Art

Japanese Patent No. 4,437,168 relates to a navigation system. In the case of acquiring navigation information across areas of different languages, the system disclosed in Japanese Patent No. 4,437,168 is capable of translating the navigation information using a language different from a used language into the used language, and of displaying the information.

Japanese Patent No. 5,185,494 relates to a communication system for making announcements to aircraft passengers. The system disclosed in Japanese Patent No. 5,185,494 is capable of providing each passenger access to a used language among a plurality of languages, of recording the used language selected by each passenger in a database, and of providing an announcement output in the selected used language from the announcement outputs which have been translated into a plurality of languages.

SUMMARY

A translation device according to the present disclosure includes an input unit for inputting an input speech sentence, which is simply described as "input sentence", and an output unit for outputting an output sentence obtained by translating the input sentence into a translation language. The translation language is set based on located language information and position information of a translation device. The located language information includes a predetermined location of each of a plurality of speakers and a used language of each of the plurality of speakers.

A translation system according to the present disclosure includes a translation device for performing translation into a set translation language, and a control device. The translation device includes an input unit for inputting an input sentence, and an output unit for outputting an output sentence obtained by translating the input sentence into a translation language. The control device detects position information of the translation device, and transmits information identifying the translation language to the translation device. The translation language is set based on located language information and the position information of the translation device. The located language information includes a predetermined location of each of a plurality of speakers and a used language of each of the plurality of speakers.

Another example of the translation system according to the present disclosure further includes a plurality of communication relay devices for relaying communication between the translation device and the control device, and a position detector. The position detector detects the position information of the translation device based on a reception of a radio wave transmitted by each of the plurality of communication relay devices.

The translation device and the translation system according to the present disclosure may set a translation language, which is a translation target, from a plurality of languages while reducing the operation burden on a user.

DETAILED DESCRIPTION

In the following, exemplary embodiments will be described in detail with reference to the drawings as appropriate. However, excessively detailed explanation may be omitted. For example, description concerning details of matters already well known, or repeated description for substantially identical configurations may be omitted. These omissions are made for avoiding redundancy in the following description, and for helping those skilled in the art easily understand the description.

Moreover, the accompanying drawings and the following description are provided only for the purpose of helping those skilled in the art sufficiently understand the present disclosure, and therefore are not intended to limit the subject matters of the appended claims in any way.

First Exemplary Embodiment

In the following, a first exemplary embodiment will be described with reference to FIGS. 1 to 6.

Figure 1:
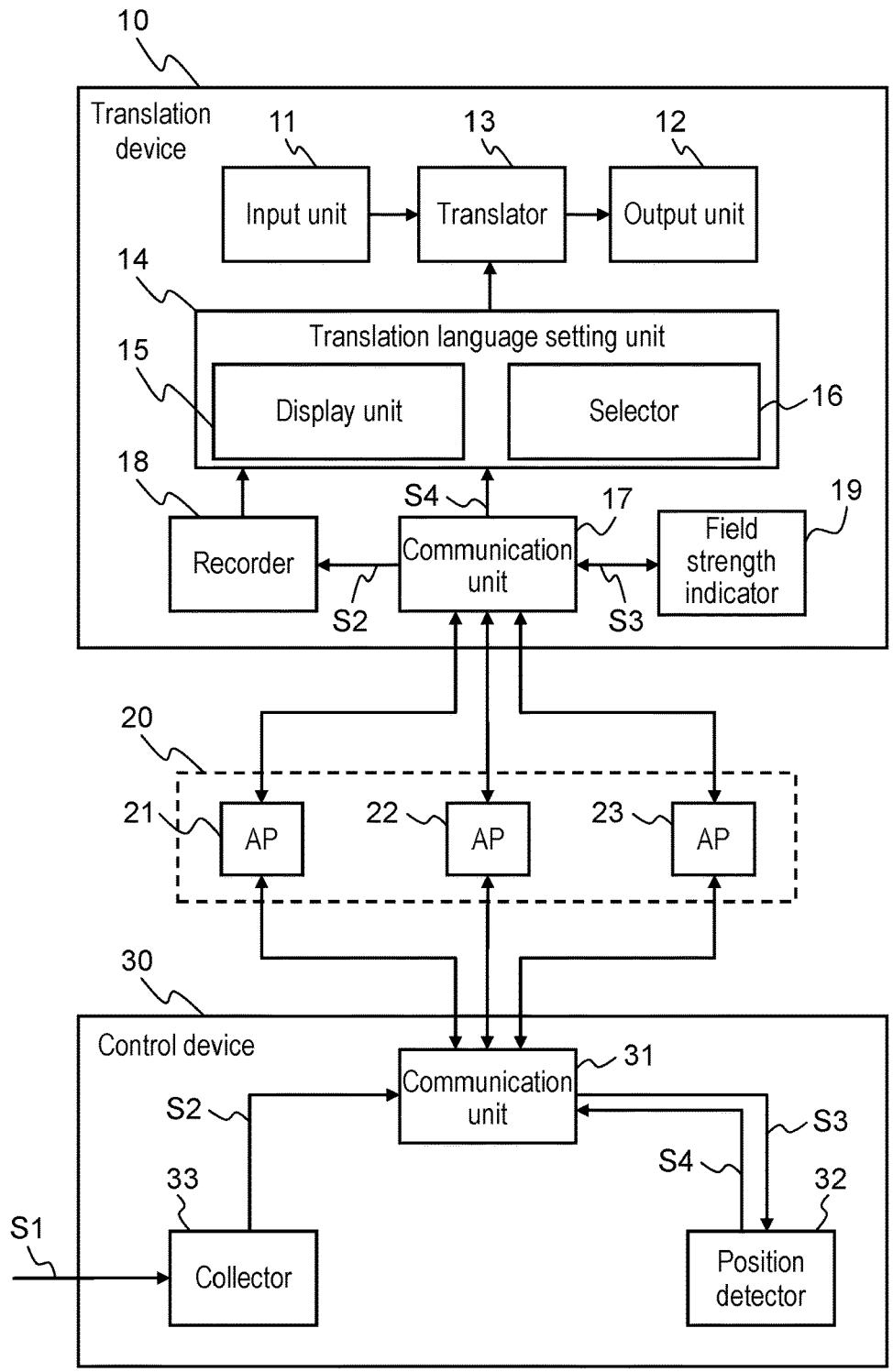
FIG. 1 is a block diagram showing a configuration of a translation system according to a first exemplary embodiment.

FIG. 1 is a block diagram showing a configuration of a translation system according to the first exemplary embodiment. The translation system includes translation device 10, communication device 20, and control device 30. A user of translation device 10 carries translation device 10, and talks to a speaker who uses a different language from the user through translation device 10. Translation device 10 translates an input sentence of the user, and conveys to the speaker the translation in the used language of the speaker.

Translation device 10 includes input unit 11, output unit 12, translator 13, translation language setting unit 14, communication unit 17, recorder 18, and field strength indicator 19.

Input unit 11 and output unit 12 include a microphone and a speaker for input/output of speech signals. Input unit 11 takes an input sentence based on the speech of the user as an input, and outputs the same after converting the input sentence into a text format.

Translator 13 takes the input sentence in the text format as an input, translates the input sentence into a translation language, which is a translation target language, and outputs the translated sentence as an output sentence in a text format. Output unit 12 converts the translated output sentence into a synthesized speech signal, and outputs the signal. Translator 13 comprises a memory device, such as a memory, for recording translation data in languages, and an arithmetic processing device, such as a CPU, for performing a translation process.

Here, translation device 10 does not have to perform all of a speech recognition process, a translation process, and a speech synthesis process. For example, the translation system may be configured to have the processes be performed at control device 30 connected to translation device 10 by a network of communication device 20. Additionally, the speech recognition process is for analyzing a speech signal and converting the signal into an input sentence in a text format. The translation process is a process for translating the input sentence into an output sentence in the translation language. The speech synthesis process is a process for converting the translated output sentence into a synthesized speech. In the case of performing all of the speech recognition process, the translation process, and the speech synthesis process at control device 30, translation device 10 transmits a speech signal input by a user to control device 30 through the network of communication device 20. Moreover, translation device 10 acquires a synthesized speech signal of the output sentence translated by control device 30 from control device 30 through the network of communication device 20. Output unit 12 of translation device 10 outputs the acquired synthesized speech signal. Additionally, in the case of performing the speech recognition process and the translation process at control device 30, and the speech synthesis process at translation device 10, translation device 10 acquires the translated output sentence in a text format from control device 30. Output unit 12 of translation device 10 outputs the synthesized speech signal of the output sentence based on the acquired output sentence in a text format.

Translation device 10 sets the language of the input sentence and the translation language of the output sentence to arbitrary languages among a plurality of languages supported by the translation system.

Communication unit 17 receives, from control device 30 connected through the network of communication device 20, located language information S2 and position information S4. Communication unit 17 receives beacon signals transmitted by access points 21, 22, 23. Access points 21, 22, 23 are Wi-Fi access points constituting communication device 20, and are disposed at predetermined locations near an area in which the translation system is used. A beacon signal is a pilot signal used for controlling communication between a Wi-Fi access point and a terminal, for example. Communication unit 17 transmits field strength information S3 generated by field strength indicator 19 to control device 30. Communication unit 17 comprises a communication antenna, a modulator, and a demodulator. The communication antenna transmits or receives a radio wave modulated to conform to a network. The modulator converts data to be transmitted into a radio wave. The demodulator converts the radio wave into the original data.

Recorder 18 stores located language information S2 and the like received from control device 30. Recorder 18 comprises a memory device such as a memory or a storage.

Translation language setting unit 14 sets the translation language, which is the translation target, based on located language information S2 stored in recorder 18 and position information S4 of translation device 10. Then, translation language setting unit 14 transmits the set translation language to translator 13. Also, translation language setting unit 14 includes display unit 15 for displaying candidate translation languages, and selector 16. Selector 16 sets, as the translation language, a language selected from the candidate translation languages. Translation language setting unit 14 comprises an arithmetic processing device, such as a CPU, a display panel, such as an LCD (Liquid Crystal Display), and a touch panel attached to the display panel. Display unit 15 includes the display panel. Selector 16 includes the touch panel.

Field strength indicator 19 measures field strengths of a plurality of beacon signals received by communication unit 17. Field strength indicator 19 generates field strength information S3 based on the measured field strength of the beacon signal. Field strength indicator 19 comprises a field strength measurement sensor, for example. Moreover, field strength indicator 19 may generate field strength information S3 based on the strengths of the radio waves from access points 21, 22, 23 received by communication unit 17.

Communication device 20 comprises a plurality (three in FIG. 1) of access points 21, 22, 23. Each access point 21, 22, 23 functions as an access point for data communication. Translation device 10 and control device 30 are allowed to communicate via any of access points 21, 22, 23. Translation device 10 detects the position of translation device 10 by using beacon signals transmitted by access points 21, 22, 23.

Control device 30 includes communication unit 31, position detector 32, and collector 33.

Communication unit 31 transmits located language information S2 and position information S4 to translation device 10 through the network of communication device 20. Communication unit 31 comprises a communication antenna, a modulator, and a demodulator. The communication antenna transmits or receives a radio wave modulated to conform to a network. The modulator converts data to be transmitted into a radio wave. The demodulator converts the radio wave into the original data.

Position detector 32 generates position information S4 of translation device 10 based on a plurality of pieces of field strength information S3. For example, the position of translation device 10 is identified by trilateration or the like based on information about the location of each access point 21, 22, 23 and field strength information S3 corresponding to the radio wave transmitted by each access point, and position information S4 is thereby generated. Position detector 32 comprises an arithmetic processing device, such as a CPU, that performs the trilateration and the like.

The flow until position information S4 is generated by position detector 32 will be described. Translation device 10 receives, by communication unit 17, beacon signals from a plurality of access points 21, 22, 23 disposed at predetermined locations near the area where the translation system is used. Then, field strength indicator 19 generates field strength information S3 for the plurality of beacon signals received by communication unit 17. Communication unit 17 transmits field strength information S3 to control device 30 via communication device 20. Position detector 32 identifies the position of translation device 10 by the trilateration or the like based on field strength information S3 received by communication unit 31. Furthermore, position detector 32 generates position information S4 based on the identified position of translation device 10.

Collector 33 acquires from a server, and holds, respective predetermined locations of a plurality of speakers in the area where the translation system is used, and information S1 about a nationality or the like that reveals a used language of each of the plurality of speakers. The server is disposed outside the translation system, and is connected to the translation system through a network. Then, collector 33 generates located language information S2 which is a combination of the predetermined location of each of the plurality of speakers in the area and the used language of each of the plurality of speakers. Collector 33 comprises a memory device, such as a memory, for recording information S1 and located language information S2, and an arithmetic processing device, such as a CPU, for generating located language information S2 from information S1. Additionally, collector 33 may acquire each piece of information from the server in advance, and hold the information.

Figure 2:
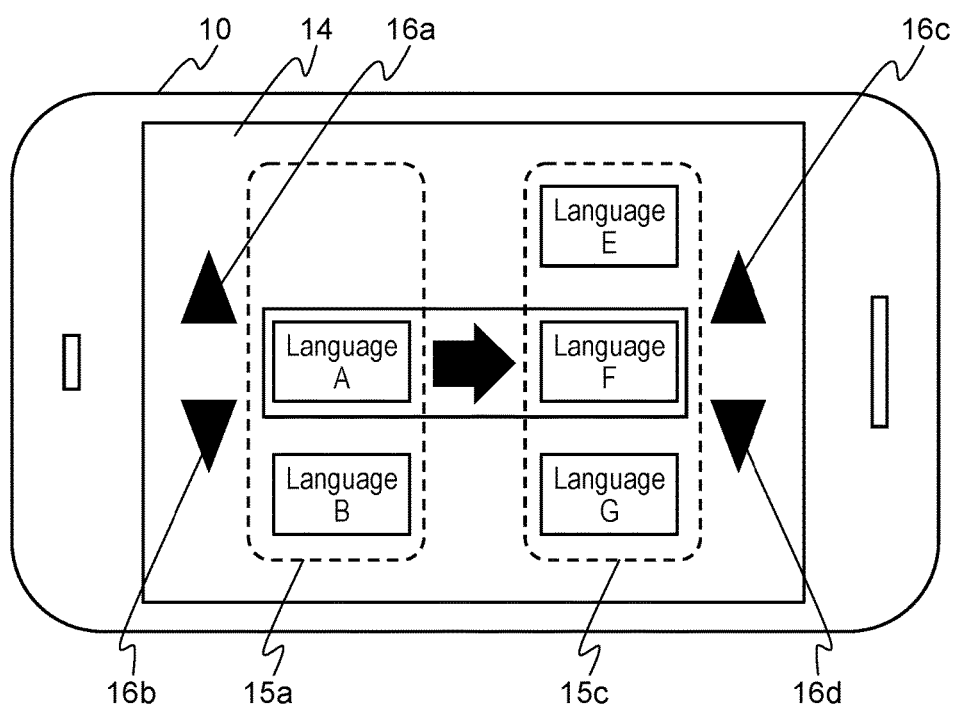
FIG. 2 is a schematic diagram of a screen where a translation device according to the first exemplary embodiment sets a translation language.

FIG. 2 is a schematic diagram of a screen of display unit 15 used for setting a translation language by translation device 10 according to the first exemplary embodiment. In FIG. 2, translation device 10 includes translation language setting unit 14 for setting the language of an input sentence and the language of an output sentence at the translation system. Translation language setting unit 14 comprises display unit 15, and selector 16. Display unit 15 displays respective candidate languages on input language display unit 15a and output language display unit 15c. Selector 16 includes a touch panel which provides language selection buttons 16a, 16b, 16c, 16d on the surface of display unit 15.

Input language display unit 15a displays language selection buttons 16a, 16b, and candidate languages for an input sentence to be subjected to the translation process. A user of translation device 10 operates language selection buttons 16a, 16b, and sets the language of the input sentence. Furthermore, output language display unit 15c displays language selection buttons 16c, 16d, and candidate languages for an output sentence after the translation process. The user of translation device 10 operates language selection buttons 16c, 16d, and sets the language of the output sentence.

Figure 3:
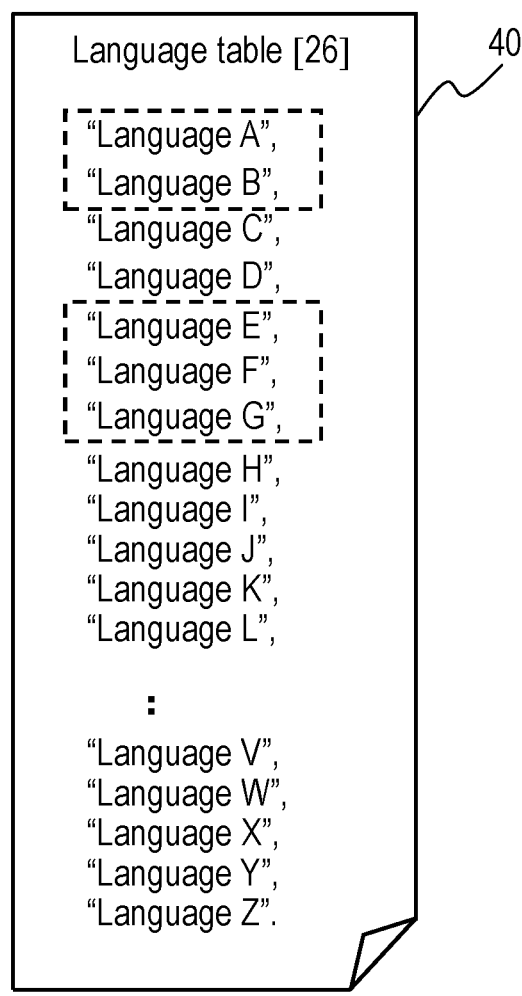
FIG. 3 is a diagram showing a language table of the translation device according to the first exemplary embodiment.

FIG. 3 is a diagram showing a language table of translation device 10 according to the first exemplary embodiment. Languages to be displayed by input language display unit 15a and output language display unit 15c are arbitrary languages among a plurality of languages supported by the translation system. The plurality of languages supported by the translation system are recorded in recorder 18. The plurality of languages in the first exemplary embodiment are languages ("language A", "language B", . . . , "language Z") that are recorded in language table 40 shown in FIG. 3. In the example shown in FIG. 2, language A, which is the used language of the user of translation device 10, is set as the language of the input sentence. Language F, which is the translation language, is set as the language of the output sentence.

Input language display unit 15a and output language display unit 15c shown in FIG. 2 display, in an array of language table 40, three or less sequential languages. That is, currently selected languages and languages that are adjacent in the array of language table 40 are displayed in input language display unit 15a and output language display unit 15c. In the case where there are no adjacent languages in the array of language table 40, no language need to be displayed, as shown on input language display unit 15a in FIG. 2, or language Z, which is the last element in the array of language table 40, and language A, which is the first element, may be adjacent to each other, as a cyclic list. The user of translation device 10 may set the currently selected language to the immediately preceding language or the immediately following language in the array of language table 40 by operating language selection buttons 16a-16d. Additionally, in the case of looping between the last element and the first element in the array of language table 40, operations of language selection buttons 16a-16d are also looped.

Figure 4:
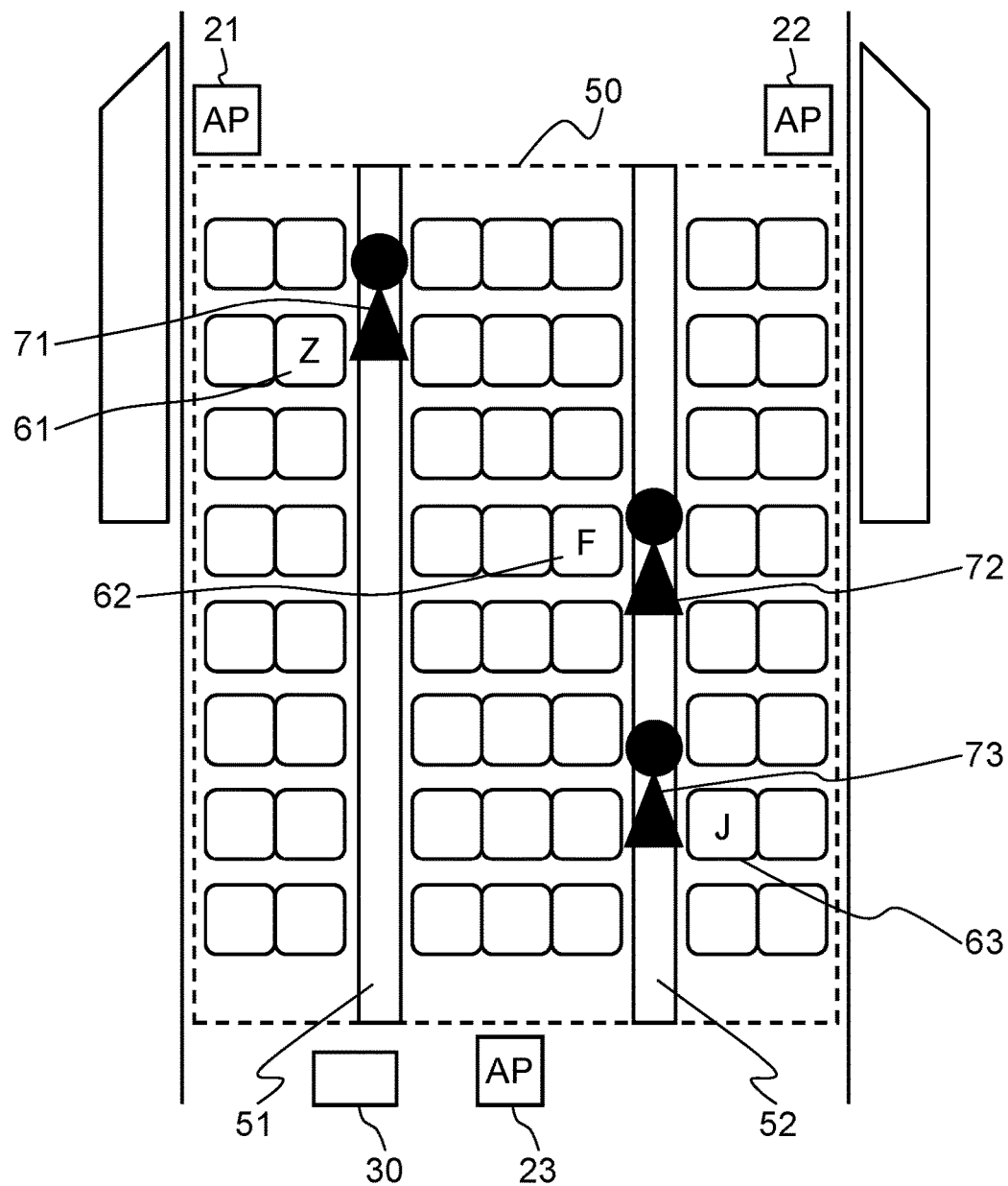
FIG. 4 is a schematic diagram of an area where the translation system according to the first exemplary embodiment is to be used.

FIG. 4 is a schematic diagram of an area where the translation system according to the first exemplary embodiment is to be used. In FIG. 4, a plurality of seats is installed across two aisles, aisle 51 and aisle 52, in area 50 where the translation system is to be used, for example. In the first exemplary embodiment, each speaker is associated with one seat. That is, the predetermined location of each of a plurality of speakers is the location of the seat associated with the speaker. Furthermore, the used language used by each speaker is also associated with the location of the seat associated with the speaker. International aircraft cabins and venues for international conferences may be cited as examples where a plurality of speakers, who use respective languages as used languages, are at respective predetermined locations.

In FIG. 4, the used languages of speakers seated in the seats are indicated by respective signs of the languages. For example, it is shown that the used language of a speaker whose predetermined location is seat 61 is language Z. In the same manner, the used languages of speakers whose predetermined locations are seats 62, 63 are respective languages F, J.

In area 50, the user of translation device 10 moves along aisle 51 or aisle 52 and converses with a speaker in area 50 by the translation system.

In FIG. 4, it is shown that position 71 of the user of translation device 10 is in aisle 51, and is near the speaker at seat 61, whose used language is language Z.

Also, position 71 of the user of translation device 10 is identified by control device 30 connected to translation device 10 through the network of communication device 20. Access points 21, 22, 23 constituting communication device 20 are installed outside area 50 in a triangular manner, as shown in FIG. 4, so as to enable trilateration by position detector 32 of control device 30.

Operation of the translation system configured in the above manner will be described below with reference to FIGS. 1, 5, and 6.

Figure 5:
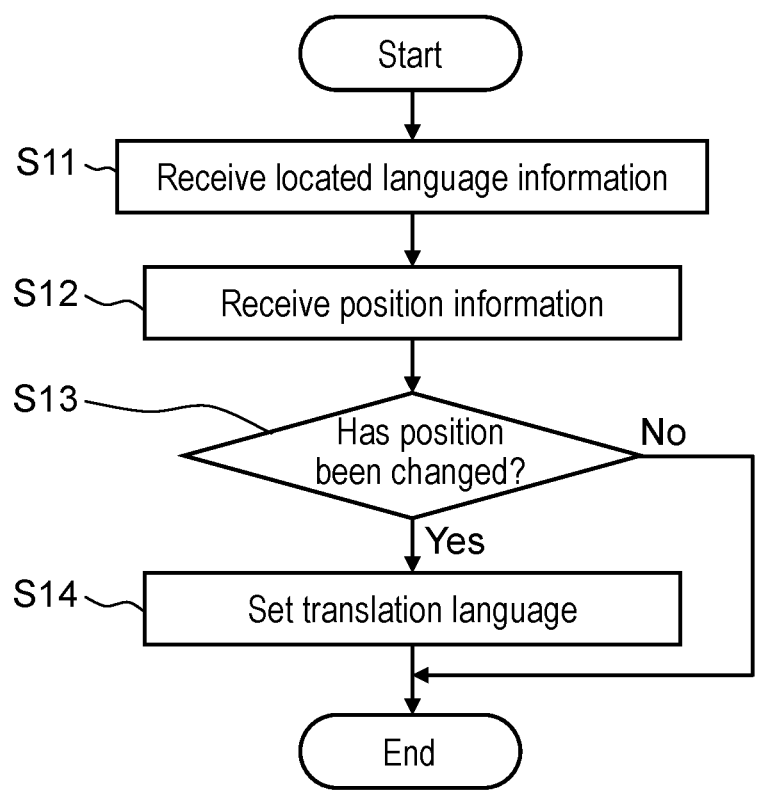
FIG. 5 is a flow chart showing a procedure for setting a translation language according to the first exemplary embodiment.

FIG. 5 is a flow chart showing a procedure for setting a translation language. Position detector 32 detects the position of translation device 10. The translation language of translation device 10 is set based on the detected position of translation device 10. The procedure of the flow chart shown in FIG. 5 may be regularly performed by translation device 10, or may be performed in response to a request from the user.

Translation device 10 receives located language information S2 generated by control device 30 (S11). Then, translation device 10 regularly receives position information S4 of translation device 10, which is detected by control device 30 (S12). Translation language setting unit 14 checks a change in the position of translation device 10 by regularly receiving position information S4 (S13).

In a case where a change in the position is detected in step S13, translation language setting unit 14 newly sets the translation language based on position information S4 and located language information S2 (S14). In a case where a change in the position of translation device 10 is not confirmed in step S13, the procedure is ended without newly setting the translation language.

Figure 6:
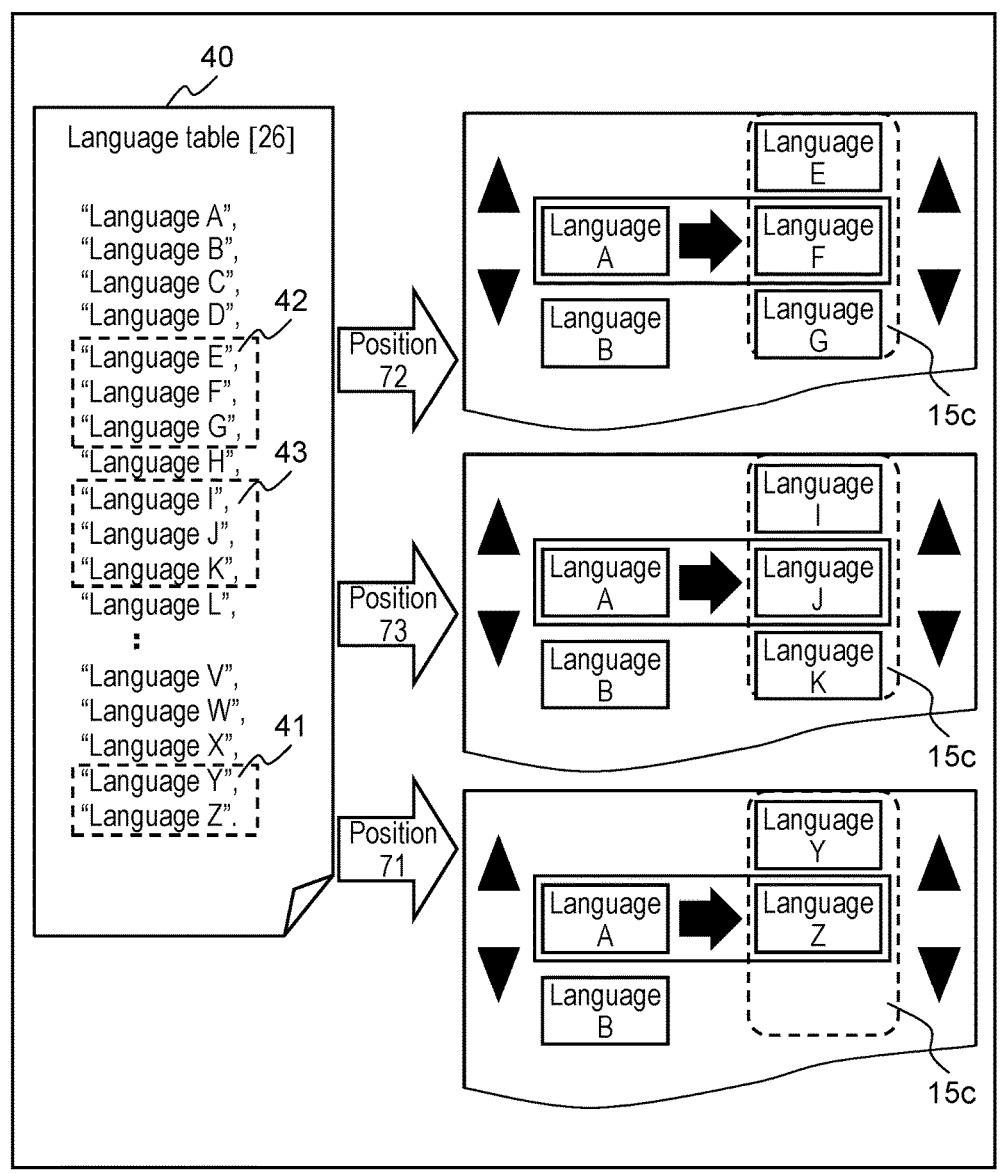
FIG. 6 is a schematic diagram showing translation languages that are set in the translation device according to the first exemplary embodiment.

FIG. 6 is a schematic diagram showing translation languages that are set in translation device 10 according to the first exemplary embodiment. Following the procedure of the flow chart shown in FIG. 5, translation language setting unit 14 changes the language which is selected on the screen of translation language setting unit 14 according to the position of translation device 10. For example, when the user carrying translation device 10 moves to each of position 71, position 72, position 73 shown in FIG. 4, the selected translation language and the display on the screen of translation language setting unit 14 of translation device 10 will be as shown in the schematic diagram in FIG. 6.

In FIG. 6, when movement to each of position 71, position 72, position 73 shown in FIG. 4 takes place, language Z, language F, language J associated with respective locations are selected as the translation languages from the array elements in language table 40. As shown in FIG. 6, part 41, part 42, part 43 containing respective translation languages, in the array of language table 40, are displayed on output language display unit 15*c* of display unit 15 of translation device 10.

As described above, in the present exemplary embodiment, translation device 10 and translation system detect the position of translation device 10, and set a translation language based on the used language of each of a plurality of speakers seated at predetermined locations, according to the position of translation device 10. Accordingly, an arbitrary language among a plurality of languages supported by the translation system may be easily set according to the position of translation device 10.

Additionally, it is needless to say that the user may further change the translation language by operating language selection buttons 16*a*-16*d* after the translation language is set according to the position of translation device 10.

Second Exemplary Embodiment

In a second exemplary embodiment, a case will be described in which a position of translation device 10 is in a sub-area where a plurality of speakers who use a same language as the used language are gathered. In the following, the second exemplary embodiment will be described with reference to FIG. 7.

In the second exemplary embodiment, control device 30 generates located language information S2 which is a combination of a sub-area where speakers who use a same used language, among a plurality of speakers, are gathered and the used language of the speakers in the sub-area, and transmits the information to translation device 10.

Figure 7:
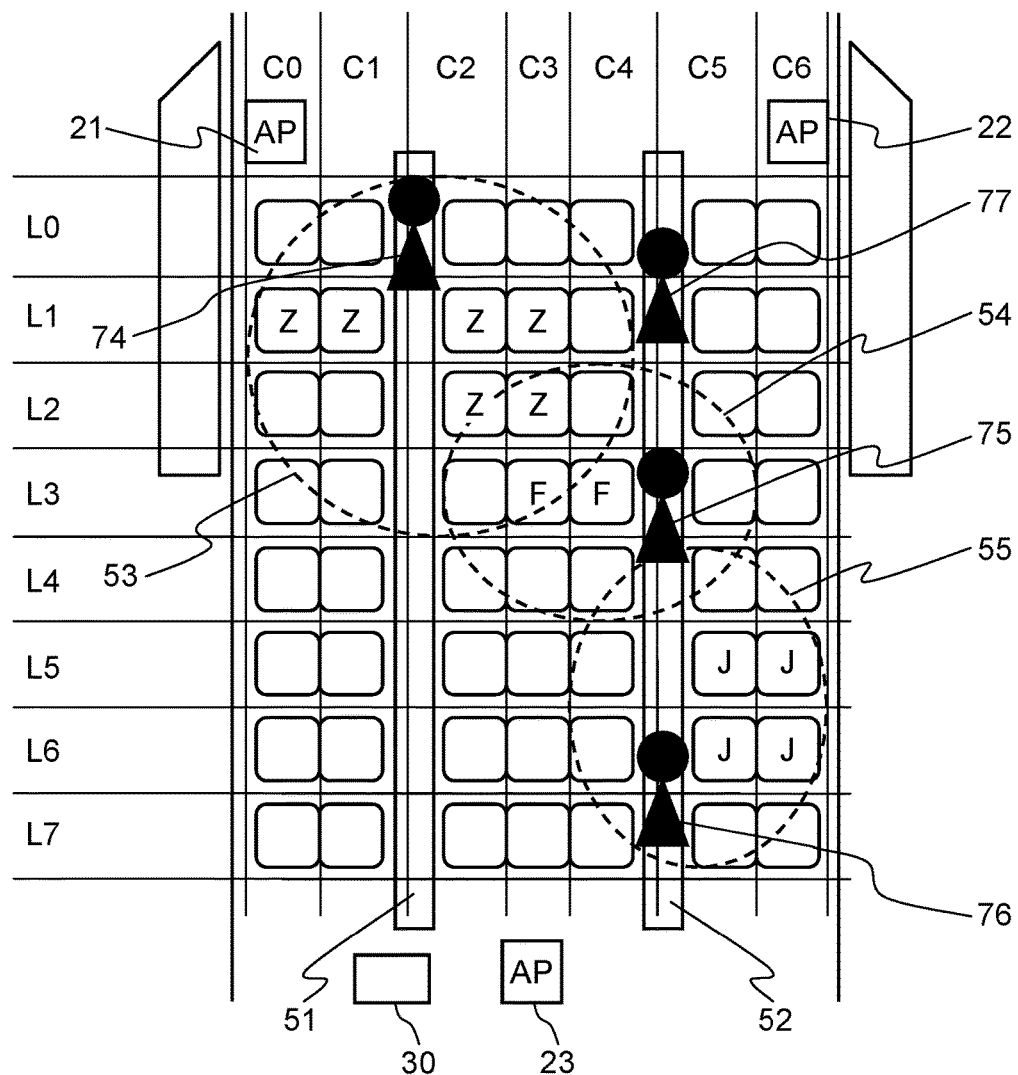
FIG. 7 is a schematic diagram of an area where a translation system according to a second exemplary embodiment is to be used.

FIG. 7 is a schematic diagram of an area where a translation system according to the second exemplary embodiment is to be used. In FIG. 7, it is shown that speakers whose used languages are language Z, language F, and language J are each seated at a seat at a predetermined location.

Also, in FIG. 7, in area 50, locations of the seats are sectioned into L0-L7 in the longitudinal direction and C0-C6 in the transverse direction. The side of L0 in the longitudinal direction is taken as the front direction, and the side of L7 is taken as the rear direction, and also, the side of C0 in the transverse direction is taken as the left direction, and the side of C6 is taken as the right direction. The indexes mean line and column indices of 2 dimensional area.

Also, in FIG. 7, speakers whose used language is language Z are seated in the seats within the ranges of (L1, C0-C3) and (L2, C2-C3). Furthermore, speakers whose used language is language F are seated in the seats within the range of (L3, C3-C4). Still further, speakers whose used language is language J are seated in the seats within the range of (L5-L6, C5-C6). For example, a plurality of speakers who use the same language as the used language are possibly seated in seats that are close to one another in the cabin of an aircraft carrying a plurality of passengers.

In this case, control device 30 defines sub-area 53 where language Z is the translation language, based on the predetermined location of each of the speakers who are seated in the above manner and whose used language is language Z, and the used language of each of a plurality of speakers. In the same manner, sub-area 54 where language F is the translation language, and sub-area 55 where language J is the translation language are defined. Furthermore, each of sub-areas 53-55 is defined so as to include respective range (L0-L3, C0-C4), (L2-L4, C2-C5), (L4-L7, C4-C6), which is enlarged to include, in addition to the seats of speakers who use the respective language as the translation language, one additional seat in each of the front direction, the rear direction, the left direction, and the right direction.

Moreover, in FIG. 7, the user of translation device 10 moves along aisle 51 or aisle 52 and, when in one of positions 74, 75, 76, converses with a speaker seated at a predetermined location in respective defined sub-area 53-55 by the translation system.

This allows switching of the translation language based on the located language information that is set to the enlarge sub-area, at the time of approaching a speaker belonging to the sub-area from one direction of the aisle in the area. According to the configuration where the translation language is switched on a per sub-area basis, a number of languages which are the candidates for the translation language to be set may be reduced at the time of movement of translation device 10. This allows the translation languages to be set to be appropriately narrowed down, and thus, the translation language may be set at an optimal timing before the start of conversation by the user. Moreover, by defining each sub-area as an enlarged sub-area which is wider than the range where the speakers who use the language as the used language are seated, candidates for the translation language may be appropriately set before the user of translation device 10 approaches a speaker. The convenience of translation device 10 is thereby increased.

Third Exemplary Embodiment

In a third exemplary embodiment, a case will be described where a position of a user of translation device 10 is near a plurality of speakers who use different languages as used languages. In the following, the third exemplary embodiments will be described with reference to FIGS. 8 to 10.

Figure 8:
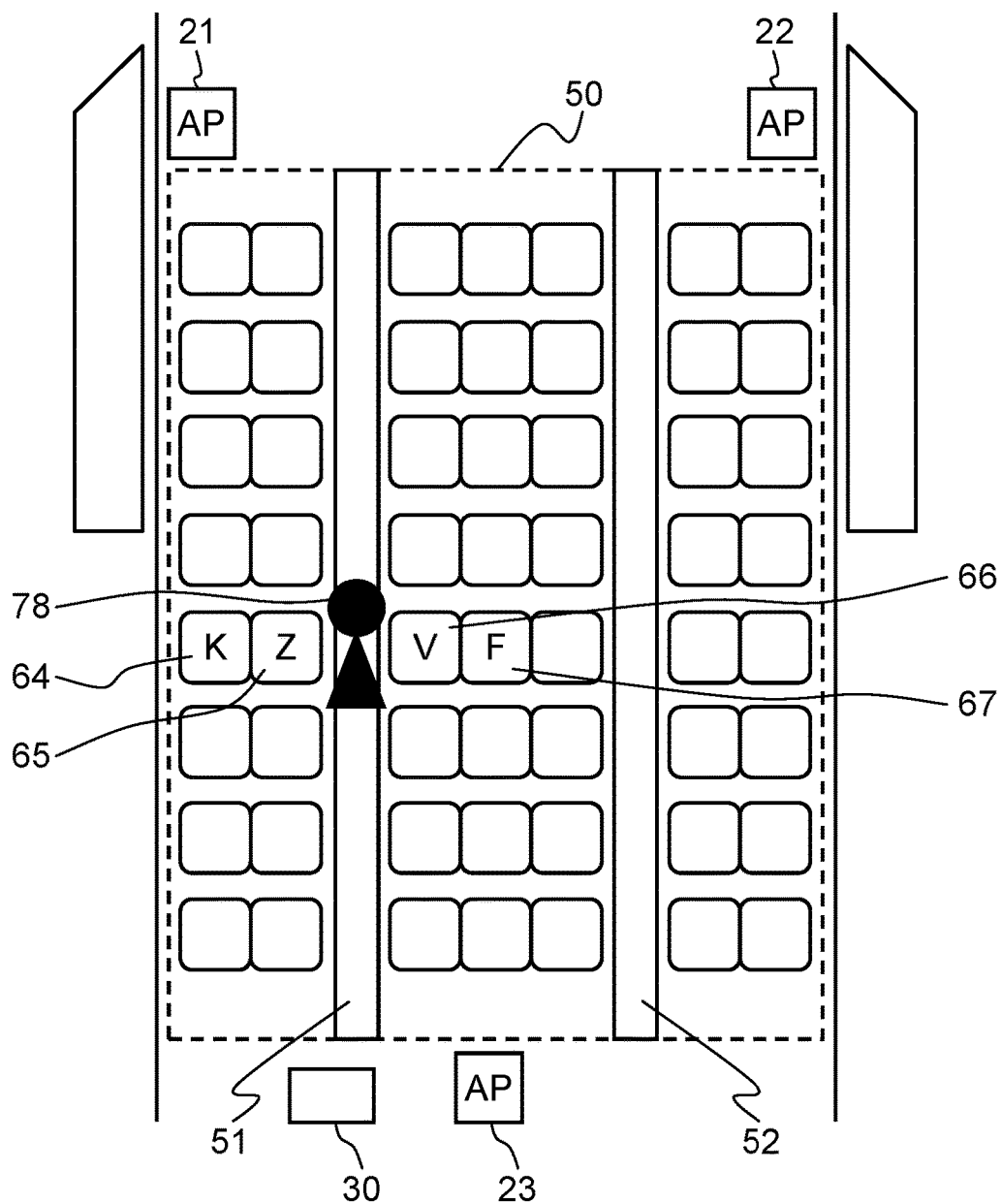
FIG. 8 is a schematic diagram of an area where a translation system according to a third exemplary embodiment is to be used.

FIG. 8 is a schematic diagram of an area where a translation system according to the third exemplary embodiment is to be used. In FIG. 8, it is shown that speakers whose used languages are language K, language Z, language V, and language F are seated in seat 64, seat 65, seat 66, seat 67, respectively.

In FIG. 8, the user of translation device 10 moves along aisle 51 or aisle 52. When the user of translation device 10 is at position 78, the user of translation device 10 converses with the speakers seated in respective seats 64-67, who use different languages as the used languages, by the translation system.

Figure 9:
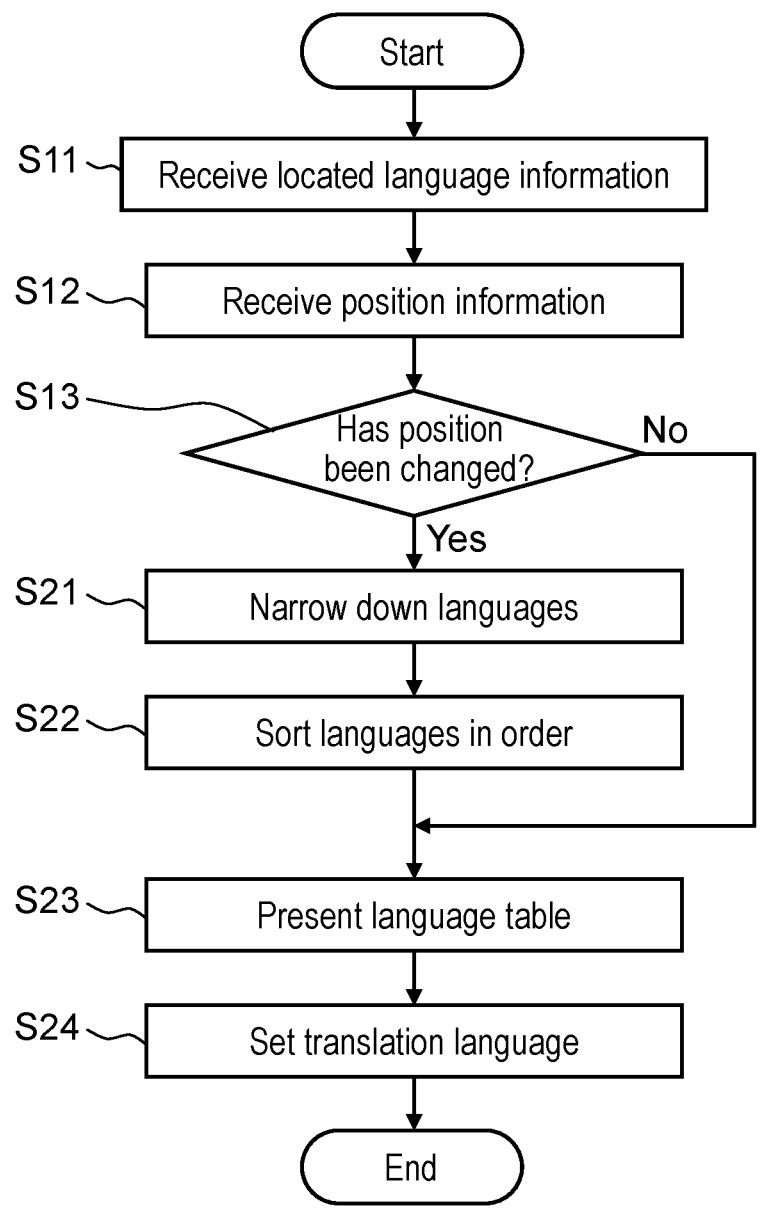
FIG. 9 is a flow chart showing a procedure for setting a translation language according to the third exemplary embodiment.

FIG. 9 is a flow chart showing a procedure for setting a translation language according to the third exemplary embodiment. The procedure of the flow chart shown in FIG. 9 may be regularly performed by translation device 10, or may be performed in response to a request from the user.

Figure 10:
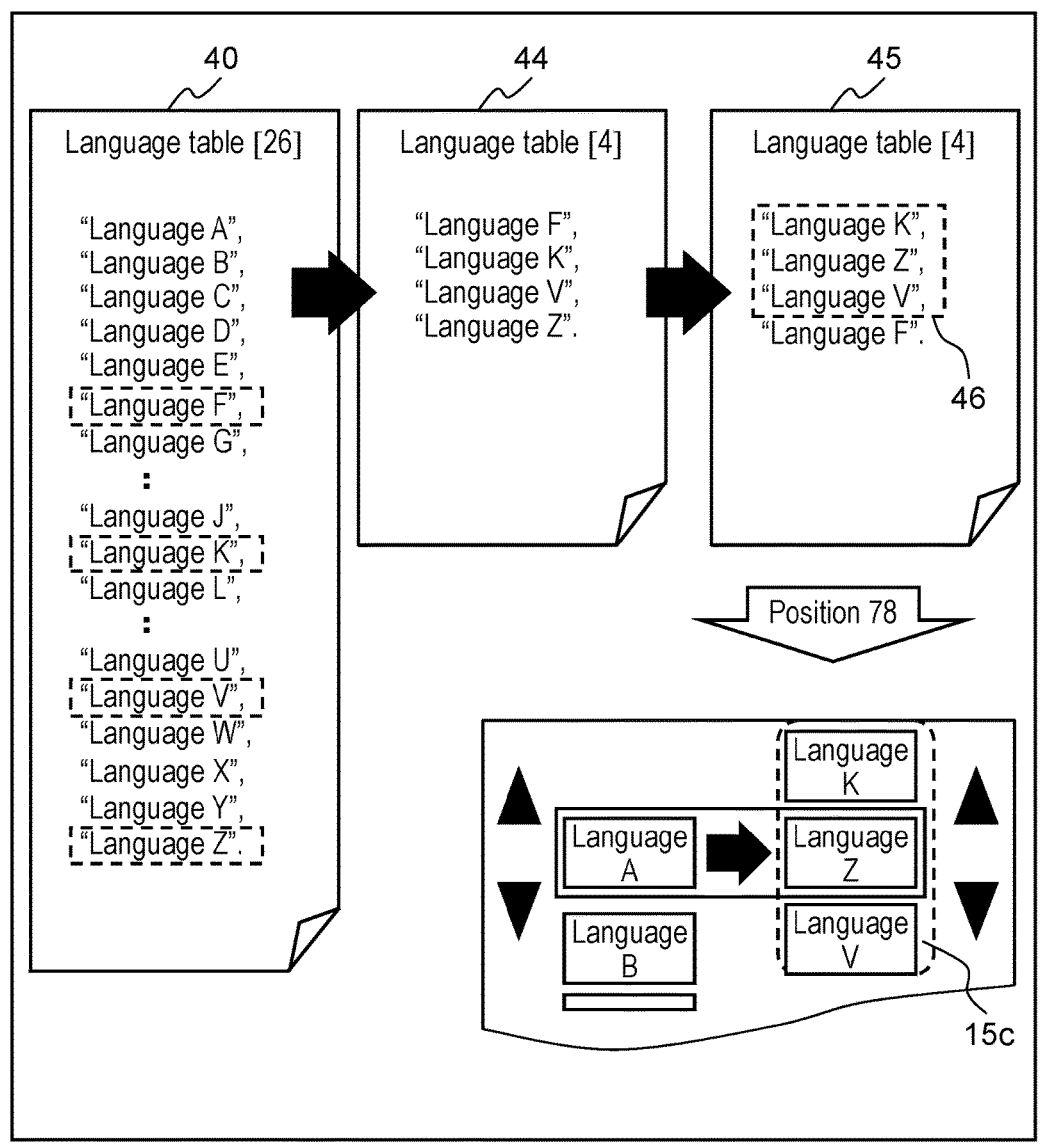
FIG. 10 is a schematic diagram of a language table and a screen for setting a translation language of the translation device according to the third exemplary embodiment.

FIG. 10 is a schematic diagram of language table 40 and a screen of translation language setting unit 14 for setting a translation language of the translation device 10 according to the third exemplary embodiment. As shown in FIG. 10, language table 44 and language table 45 are generated based on language table 40, by the procedure of the flow chart shown in FIG. 9. FIG. 10 also shows a screen, of translation device 10, for setting the language of an input sentence and the language of an output sentence.

In FIG. 9, steps S11-S13 are the same as the respective steps in FIG. 5. In step S13, if a change in the position of translation device 10 is confirmed, translation language setting unit 14 generates language table 44 from language table 40 (S21). Language table 40 contains N (N=26) languages supported by the translation system as array elements. M (M=4) languages ("language F", "language K", "language V", "language Z") narrowed down from the N languages contained in language table 40 are contained in language table 44. In step S21, translation language setting unit 14 generates language table 44 by narrowing down the languages contained in language table 40 based on position information S4 and located language information S2. More specifically, translation language setting unit 14 identifies the position of translation device 10 based on position information S4, and identifies speakers around translation device 10 based on located language information S2. Furthermore, translation language setting unit 14 selects only the used languages used by one or more identified speakers from among the languages contained in language table 40, and store the languages in the array of language table 44. Moreover, translation language setting unit 14 generates language table 45 in which the order of the languages in language table 44 are sorted in the order of the seats in area 50, based on located language information S2 (S22). Then, translation device 10 presents a part of language table 45 to the user (S23). Translation language setting unit 14 sets a translation language among the M languages in language table 45 according to a request from the user (S24).

FIG. 10 shows a case where the position of translation device 10 is moved to position 78 shown in FIG. 8, until the user of translation device 10 sets the translation language. Translation language setting unit 14 generates language table 44 containing the M languages ("language F", "language K", "language V", "language Z") which have been selected from the N languages in language table 40. Also, translation language setting unit 14 sorts the array elements in language table 44 based on the located language information, and generates language table 45. When one language is selected as the translation language according to a request from the user, part 46 of language table 45 is displayed on output language display unit 15c of translation device 10.

As described above, translation language setting unit 14 selects a candidate language group including only the used languages of speakers near the position of translation device 10, from a translation language group including a plurality of languages. Display unit 15 of translation language setting unit 14 displays a plurality of languages, such as the currently selected translation language, among the languages included in the candidate language group. Selector 16 of translation language setting unit 14 selects the translation language to be used for translation from the candidate language group, according to an operation by the user of translation device 10. Additionally, the translation language group corresponds to the languages contained in language table 40. The candidate language group corresponds to the languages contained in language table 44 or language table 45.

Accordingly, in a case where a plurality of speakers, whose used languages are different from one another, are present adjacent to one another as shown in FIG. 8, a number of operations for setting a translation language may be reduced by generating, based on the position information and the located language information, a language table containing M languages from the language table containing N languages supported by the translation system. Also, the user may intuitively set a translation language by being presented with a language table which is sorted in a manner reflecting the positional relationship of the position of the user and speakers at predetermined locations based on the located language information.

Fourth Exemplary Embodiment

A fourth exemplary embodiment describes a case where a control device is provided with a translation language setting unit. In the following, the fourth exemplary embodiment will be described with reference to FIG. 11. Translation device 10 and communication device 20 are the same as in the first exemplary embodiment, and detailed description will be omitted.

Figure 11:
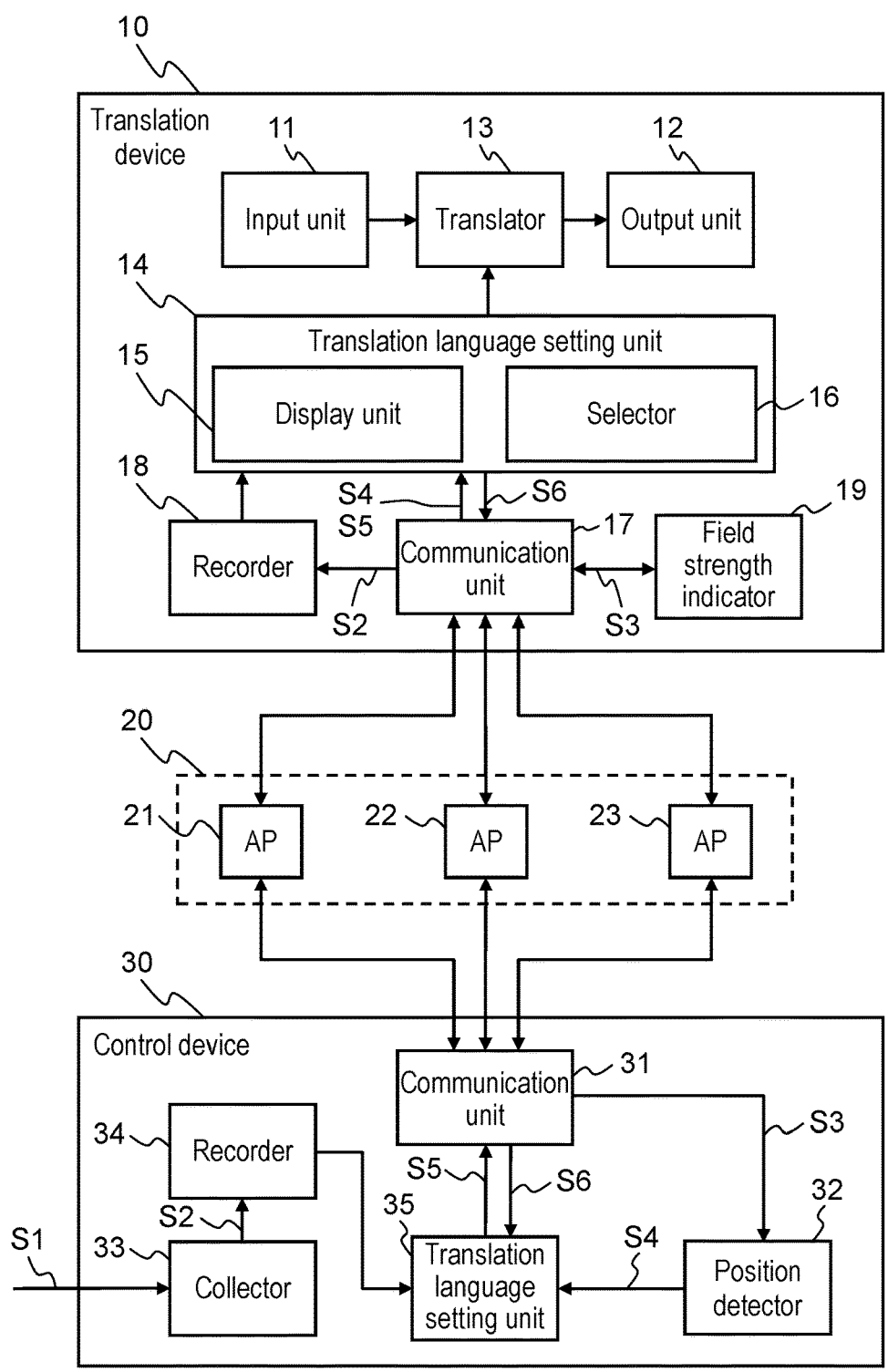
FIG. 11 is a block diagram showing a configuration of a translation system according to a fourth exemplary embodiment.

FIG. 11 is a block diagram showing a configuration of a translation system according to the fourth exemplary embodiment. The translation system includes translation device 10, communication device 20, and control device 30. Control device 30 includes communication unit 31, position detector 32, collector 33, recorder 34, and translation language setting unit 35.

In FIG. 11, communication unit 31, position detector 32, and collector 33 are the same as those in the first exemplary embodiment. Recorder 34 stores located language information S2. Translation language setting unit 35 sets a translation language based on located language information S2 that is stored, and position information S4 of translation device 10 that is generated by position detector 32. Then, communication unit 31 transmits translation language S5 that is set to translation device 10.

Furthermore, in the case where the position of the user of translation device 10 is near a plurality of speakers who uses different languages as the used languages, translation language setting unit 35 generates language table 45 to be presented to the user, based on located language information S2 and position information S4. Then, communication unit 31 transmits language table 45 to be presented to the user. Moreover, communication unit 31 receives translation language S6 which is set according to a request from the user input from translation language setting unit 14 of translation device 10. Translation language setting unit 35 sets translation language S5 according to the request from the user. Then, communication unit 31 transmits translation language S5 which is set to translation device 10.

Moreover, translation device 10 is assumed to include translation language setting unit 14 and recorder 18. However, because control device 30 is provided with translation language setting unit 35 and recorder 34, translation device 10 does not have to include translation language setting unit 14 and recorder 18. Furthermore, control device 30 may include translator 36, as shown in FIG. 12.

Figure 12:
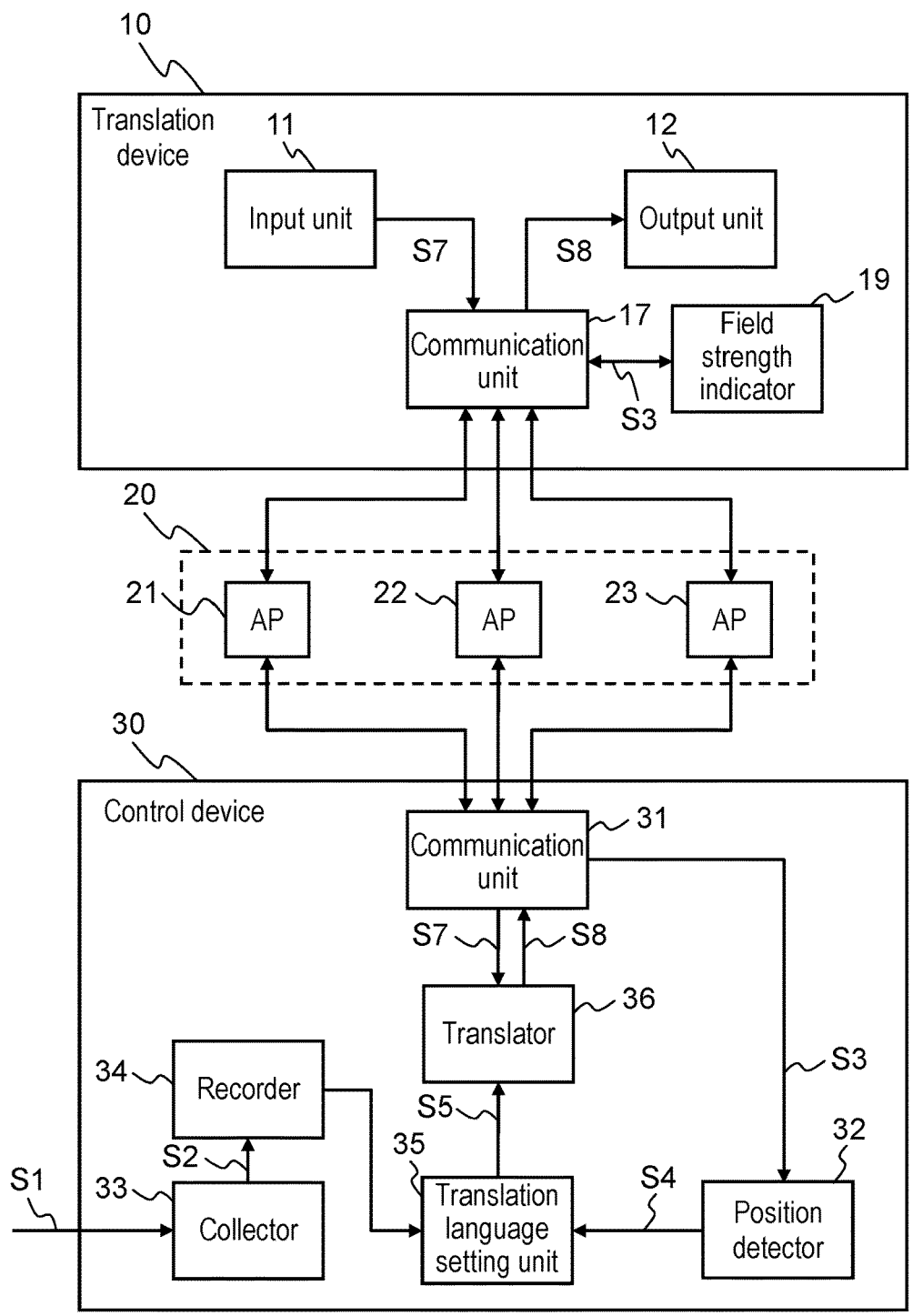
FIG. 12 is a block diagram showing another configuration of the translation system according to the fourth exemplary embodiment.

FIG. 12 is a block diagram showing another configuration of the translation system according to the fourth exemplary embodiment. In FIG. 12, collector 33 of control device 30 acquires respective predetermined locations of a plurality of speakers and information S1 about nationalities or the like of the plurality of speakers. Then, collector 33 generates located language information S2. Recorder 34 stores located language information S2. Position detector 32 receives field strength information S3 for beacon signals transmitted by access points constituting communication device 20. Moreover, position detector 32 performs trilateration or the like based on a plurality of pieces of field strength information S3, identifies the position of translation device 10, and generates position information S4. Additionally, field strength information S3 is a reception state of a beacon signal detected by communication unit 17 of translation device 10. Translation language setting unit 35 sets translation language S5 in translator 36 based on located language information S2 that is stored, and position information S4 of translation device 10 that is generated by position detector 32.

Next, input unit 11 of translation device 10 inputs an input sentence based on a speech of a user, and converts the input sentence into input sentence S7 in a text format. Communication unit 17 transmits input sentence S7 to communication unit 31 of control device 30. Translator 36 of control device 30 translates input sentence S7 received via communication unit 31 into output sentence S8 in a text format in translation language S5 set by translation language setting unit 35. Communication unit 31 transmits output sentence S8 to communication unit 17 of translation device 10. Output unit 12 of translation device 10 converts translated output sentence S8 into a synthesized speech signal, and outputs the signal.

Accordingly, even if the translation device has a simple configuration which does not include the translation language setting unit and the translator, an arbitrary language among a plurality of languages supported by the translation system may be easily set and translation may be performed according to the position of the translation device.

Heretofore, the first exemplary embodiment to the fourth exemplary embodiment have been described as examples of the technology of the present disclosure. However, the technology of the present disclosure may also be applied to other exemplary embodiments.

Additionally, in each exemplary embodiment, the position of translation device 10 is detected by trilateration based on the field strength information for the beacon signals transmitted by the access points. However, trilateration may alternatively be performed by GPS. Also, a device which transmits a beacon signal may be included in addition to the access points, and the position of translation device 10 may be identified based on the beacon signal from the device. In the case of identifying the position of translation device 10 based on the beacon signals transmitted by the access points, a communication circuit of communication unit 17 of translation device 10 may be shared with that for communication with control device 30. That is, the configuration of translation device 10 can be simplified.

Furthermore, the translator for performing the speech recognition process, the translation process, and the speech synthesis process, the translation language setting unit for setting a translation language, the collector for generating the trilateration language information, the process for measuring the position of the translation device, and the process performed by the position detector for generating the position information may be programs to be executed by central processing units (CPUs) installed on the translation device and the control device.

The present disclosure may be applied in a case where a crew member who provides services to passengers in an area where a plurality of speakers who use different languages as the used languages are present at respective predetermined locations converses with the passengers by the translation system, such as in a cabin of an aircraft where passengers are seated in predetermined seats.

What is claimed is:

1. A translation device for performing translation into a set translation language, the translation device comprising:
    an input device for inputting an input sentence, the input device including a microphone;
    a translation language setting processor for (i) regularly determining whether a change in a position of the translation device has occurred and (ii) when a change in the position of the translation device is determined, setting the translation language from among used languages of speakers near the translation device based on located language information and position information of the translation device; and
    an output device for outputting an output sentence obtained by translating the input sentence into the translation language set by the translation language setting processor, the output device including a speaker,
    wherein the located language information includes a predetermined location of each of a plurality of speakers and a used language of the each of the plurality of speakers.

2. The translation device according to claim 1, comprising:
    a communication device for receiving the position information and the located language information; and
    a recorder for recording the located language information.

3. The translation device according to claim 2,
    wherein the translation language setting processor selects a candidate language group including only the used languages of the speakers near the translation device from a translation language group including a plurality of languages, based on the located language information and the position information, and
    wherein the translation device includes
        a display for displaying languages included in the candidate language group, and
        a selector for selecting the translation language from the candidate language group.

4. The translation device according to claim 3,
    wherein the translation language setting processor sets the languages included in the candidate language group in an order according to the position information, and
    wherein the display displays the languages based on the order of the languages included in the candidate language group.

5. The translation device according to claim 1,
wherein the communication device transmits the input sentence and the translation language to a control device that is connected to the translation device through the communication device, and receives the output sentence that has been translated into the translation language by the translation device, and
wherein the output device outputs the output sentence received by the communication device.

6. The translation device according to claim 1, wherein the located language information includes a sub-area including speakers who use a same used language, among the plurality of speakers, and the used language of the speakers in the sub-area.

7. A translation system comprising:
a translation device for performing translation into a set translation language; and
a control device including a translation language setting processor for (i) regularly determining whether a change in a position of the translation device has occurred and (ii) when a change in the position of the translation device is determined, setting the translation language from among used languages of speakers near the translation device based on located language information and position information of the translation device,
wherein the translation device includes
an input device for inputting an input sentence the input device including a microphone, and
an output device for outputting an output sentence obtained by translating the input sentence into the translation language set by the translation language setting processor, the output device including a speaker,
wherein the control device detects the position information of the translation device, and transmits information identifying the translation language to the translation device, and
wherein the located language information includes a predetermined location of each of a plurality of speakers and a used language of the each of the plurality of speakers.

8. The translation system according to claim 7,
wherein the control device further includes
a position detector for detecting the position of the translation device,
a collector for collecting the located language information including the predetermined location of the each of the plurality of speakers and the used language of the each of the plurality of speakers, and
a first communication device for transmitting the position information of the translation device and the located language information to the translation device, and wherein the translation device further includes
a second communication device for receiving the position information and the located language information, and
a recorder for recording the located language information.

9. The translation system according to claim 7,
wherein the translation language setting processor selects a candidate language group including only used languages of speakers near the translation device from a translation language group including a plurality of languages, based on the located language information and the position information, and wherein the translation device includes
a display for displaying languages included in the candidate language group, and
a selector for selecting the translation language from the candidate language group.

10. The translation system according to claim 9,
wherein the translation language setting processor sets the languages included in the candidate language group in an order according to the position information, and
wherein the display displays the languages based on the order of the languages included in the candidate language group.

11. The translation system according to claim 7,
wherein the second communication device transmits the input sentence and the translation language to the control device, and receives the output sentence that has been translated into the translation language by the translation device, and
wherein the output device outputs the output sentence received by the second communication device.

12. The translation system according to claim 7, wherein the located language information includes a sub-area including speakers who use a same used language, among the plurality of speakers, and the used language of the speakers in the sub-area.

13. The translation system according to claim 7,
wherein the control device further includes
a position detector for detecting the position of the translation device,
a collector for collecting the located language information including the predetermined location of the each of the plurality of speakers and the used language of the each of the plurality of speakers,
a recorder for recording the located language information, and
a first communication device for transmitting the translation language to the translation device, and
wherein the translation device further includes a second communication device for receiving the translation language.

14. The translation system according to claim 7,
wherein the control device further includes
a position detector for detecting the position of the translation device,
a collector for collecting the located language information including the predetermined location of the each of the plurality of speakers and the used language of the each of the plurality of speakers,
a recorder for recording the located language information,
a translator for translating the input sentence into the translation language to obtain the output sentence, and
a first communication device for receiving the input sentence, and for transmitting the output sentence, and
wherein the translation device further includes a second communication device for receiving the output sentence.

15. The translation system according to claim 7, further comprising:
a plurality of communication relay devices for relaying communication between the translation device and the control device; and
a position detector for detecting the position information of the translation device, wherein the position detector detects the position information of the translation device based on a reception state, at the translation device, of a radio wave transmitted by each of the plurality of communication relay devices.

16. A translation system comprising:
an input device for inputting an input sentence, the input device including a microphone;
a translation device including an output device for outputting an output sentence, the output device including a speaker,
a translation language setting processor for (i) regularly determining whether a change in a position of the translation device has occurred and (ii) when a change in the position of the translation device is determined, setting a translation language from among used languages of speakers near the translation device based on located language information and position information of the translation device; and
a translator for translating the input sentence into the translation language set by the translation language setting processor to obtain the output sentence; and
wherein the translation system further includes
a recorder for recording located language information including a location of each of a plurality of speakers and a used language of the each of the plurality of speakers, and
a position detector for detecting position information of the translation device,
wherein the translation system sets the translation language for the translation device based on the located language information and the position information of the translation device,
wherein the translator translates the input sentence for the translation device into the output sentence for the translation device based on the translation language for the translation device, and
wherein the output device of the translation device outputs the output sentence for the translation device.

17. The translation system according to claim 16, comprising a plurality of communication relay devices,
wherein the translation device is capable of performing communication with each of the plurality of communication relay devices, and
wherein the position detector detects the position information of the translation device based on a reception state, at the translation device, of a radio wave transmitted by each of the plurality of communication relay devices.

* * * * *